US012495236B2

(12) United States Patent
McCutcheon

(10) Patent No.: US 12,495,236 B2
(45) Date of Patent: Dec. 9, 2025

(54) EAR CUSHION, AN EARPHONE AND A BINAURAL LISTENING DEVICE

(71) Applicant: GN Audio A/S, Ballerup (DK)

(72) Inventor: Peter John McCutcheon, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 221 days.

(21) Appl. No.: 18/455,797

(22) Filed: Aug. 25, 2023

(65) Prior Publication Data

US 2024/0107216 A1 Mar. 28, 2024

(30) Foreign Application Priority Data

Sep. 23, 2022 (EP) ..................................... 22197350

(51) Int. Cl.
*H04R 1/10* (2006.01)

(52) U.S. Cl.
CPC ......... *H04R 1/1008* (2013.01); *H04R 1/1066* (2013.01); *H04R 1/1083* (2013.01); *H04R 2420/07* (2013.01)

(58) Field of Classification Search
None
See application file for complete search history.

(56) References Cited

U.S. PATENT DOCUMENTS 4,174,155 A 11/1979 Herman
2019/0110929 A1 * 4/2019 Persson ................ H04R 1/1041
2024/0147107 A1 * 5/2024 Blewett ................ H04R 1/1008

FOREIGN PATENT DOCUMENTS

EP 3188494 A1 * 7/2017 ........... H04R 1/1091
WO 2022192181 A1 9/2022

OTHER PUBLICATIONS

The extended European Search Report issued in European Application No. 22197350.6, dated Feb. 22, 2023.

* cited by examiner

*Primary Examiner* — Antim G Shah
(74) *Attorney, Agent, or Firm* — HSML P.C.

(57) ABSTRACT

Disclosed is an annular ear cushion for an earphone configured to be worn at an ear of a user. The ear cushion is configured to abut the head of the user along an annular contact surface of the ear cushion and to abut or face a housing of the earphone along an annular attachment surface of the ear cushion when the user is wearing the earphone in its intended position, thereby reducing the level of sound entering the ear canal of the user from the environment. The ear cushion further comprising an annular exterior surface and an annular interior surface each extending from the contact surface to the attachment surface and facing respectively the environment and the ear canal of the user when the user is wearing the earphone in its intended position. The ear cushion further comprising a foam core (150) having a first acoustic impedance, and a cover having a first portion extending across the exterior surface and a second portion extending across the contact surface. The first portion of the cover has a second acoustic impedance that is greater than the first acoustic impedance, wherein that at least one first subportion of the second portion of the cover has a third acoustic impedance that is smaller than the second acoustic impedance.

12 Claims, 3 Drawing Sheets

EAR CUSHION, AN EARPHONE AND A BINAURAL LISTENING DEVICE

This application claims priority from EP22197350.6 filed 23 Sep. 2022 and such priority application also hereby incorporated by reference into this US application.

FIELD

The present invention relates to an ear cushion, an earphone and a binaural listening device. More specifically, the disclosure relates to an ear cushion for an earphone configured to be worn at an ear of a user to reduce the level of sound entering the ear canal of the user from the environment.

BACKGROUND

Various types of listening devices such as earphones, headsets and headphones have been developed over the past years. A type of listening devices comprises soft parts which face the ears of the user when the user is wearing the listening device. The soft parts of such listening devices provide a comfortable experience to the user and adapt to the surface of the users head. In addition, the soft parts of such listening devices may reduce noise from the environment. However, some noise form the environment may still leak around such a listening device and hence into the ear canal of the user. For instance, when the user wears glasses with temple bars, the temple bars may lift the soft parts of the listening devices from the head and sound may leak into the ear canal of the user. Therefore, there is a need for an improved listening device that addresses the problems of the conventional listening devices.

SUMMARY

According to a first aspect, disclosed is an annular ear cushion for an earphone configured to be worn at an ear of a user. The ear cushion is configured to abut the head of the user along an annular contact surface of the ear cushion and to abut or face a housing of the earphone along an annular attachment surface of the ear cushion when the user is wearing the earphone in its intended position, thereby reducing the level of sound entering the ear canal of the user from the environment. The ear cushion further comprises an annular exterior surface and an annular interior surface each extending from the contact surface to the attachment surface and facing respectively the environment and the ear canal of the user when the user is wearing the earphone in its intended position. The ear cushion further comprises a foam core having a first acoustic impedance, and a cover having a first portion extending across the exterior surface and a second portion extending across the contact surface, wherein the first portion of the cover has a second acoustic impedance that is greater than the first acoustic impedance, and wherein at least one first subportion of the second portion of the cover has a third acoustic impedance that is smaller than the second acoustic impedance. Typically, when the user wears the earphone in its intended position, i.e. when the earphone is positioned correctly at the ear of the user, the ear cushion fits to the users head so that there are no ways for sound from the environment to reach the ear canal of the user without going through the ear cushion, the housing of the earphone, any vents provided in the housing, or the users head. In this way, conventional earphones may reduce the level of noise that the user hears from the environment. This is because the acoustic impedance of most solid (or liquid) materials such as the cover, the earphone housing and the user's head is much higher than the acoustic impedance of the air. Also, vents are typically tuned to provide a low acoustic impedance only to low-frequency sound, such as e.g. sound with a frequency below 100 Hz. Typically, the acoustic impedance of the cover and the housing is in the order of 100:1, compared to the acoustic impedance of the air. Therefore, when the user wears the earphone in its intended position, the sound propagating through air and impinging on the earphone will to a large extent be reflected off the earphone rather than be able to propagate through the earphone. In other words, when the user wears the earphone in its intended position, only little sound from the environment makes its way through the earphone. Thereby, the earphone provides noise reduction, also known as passive noise reduction.

Providing the first portion of the cover, extending across the exterior surface, to have the second acoustic impedance being greater than the first acoustic impedance of the foam core, helps in ensuring that sound from the environment is effectively reflected off the exterior surface. The second acoustic impedance may be at least five or ten times greater than the first acoustic impedance, or even at least twenty or fifty times greater than the first acoustic impedance.

The present invention concerns solving the problem when there is a leak or gap between the ear cushion and the user's head, i.e. when there is an air-filled gap between the ear cushion and the users head that extends from the exterior surface to the interior surface. This may happen for instance when the user wears an object, such as a pair of glasses with temple bars or a face mask with neck or ear strings, that lifts off a portion of the ear cushion from the head. In such cases, the sound from the environment may propagate, or leak, more easily through the gap and into the ear canal of the user.

The first subportion of the second portion of the cover extends across at least a portion of the contact surface, such that when the user does not wear glasses or other problematic objects, the first subportion of the second portion of the cover may at least partly abut the user's head. The at least one first subportion may or may not extend into the interior surface. Preferably, the at least one first subportion does not extend into the exterior surface in order not to compromise the passive noise reduction provided by the first portion of the cover.

Preferably, the at least one first subportion may be provided at a portion of the contact surface where a leak, i.e. an air-filled gap between the ear cushion and the user's head, is expected to appear, such as at a portion of the contact surface that is intended to abut a region of the user's head where temple bars are typically located, at a portion of the contact surface that is intended to abut a region of the user's head where hair is likely to be trapped between the ear cushion and the user's head, and/or at a portion of the contact surface that is intended to abut a region of the user's ear that is typically irregular or crested, such as ear features near or at the intertragic notch. It is further an advantage that the at least one first subportion of the second portion of the cover has the third acoustic impedance being smaller than the second acoustic impedance. In other words, it is an advantage that the at least one first subportion of the second portion of the cover, which may hereinafter be referred to as the "leaky cover portion(s)", has a smaller acoustic impedance than the exterior surface of the cover. The third acoustic impedance may be at least five or ten times smaller than the second acoustic impedance, or even at least twenty or fifty times smaller than the second acoustic impedance. For instance, the third acoustic impedance may be in the order of 1:10, compared to the second acoustic impedance. It is preferred that the third acoustic impedance of the at least one first subportion of the second portion of the cover is very low. In other words, it is preferred that the at least one first subportion of the second portion of the cover is acoustically transparent. Thereby, when there is a leak between the ear cushion and the user's head and the sound from the environment propagates through the leak, at least a portion of such leak sound diverges off through the at least one first subportion of the second portion of the cover into the foam core that preferably dissipates it, i.e. converts the sound energy to heat energy. Thereby, a reduced portion of the sound from the environment reaches the ear canal. In that way, the present invention prevents or at least mitigates such leaking problem and provides at least an improved passive noise reduction when there is a leak.

The foam core may take up the entire space delimited by the exterior surface, the interior surface and the contact surface, except for the space occupied by the cover in order to maximize the sound dissipation provided by the foam core. In some examples, the foam core may comprise bores, tubes or cavities. The foam core may have a high air permeability such as about 10, 20, or 40 cm3/s/cm2. Thereby, such high air permeability of the foam core may further improve the passive noise cancellation when there is a leak. Alternatively, or additionally, the foam core may comprise a foam or foam-like material configured to resonate with sound to mechanically absorb the sound energy. The foam core may comprise multiple portions having different properties and/or comprising different types of foams or foam-like materials.

The ear cushion for the earphone may be configured to be worn over the ear of the user. The ear cushion for the earphone may be configured to be worn on the ear of the user. The ear cushion for the earphone may be configured such that it is comfortable to wear by being soft, lightweight, and pliable i.e. able to adapt to the surface of the users head. In addition, the ear cushion may be configured such that it does not collapse completely under a clamping force of e.g. a headband. The contact surface of the ear cushion may be arranged opposite to the attachment surface of the ear cushion. The ear cushion may have a doughnut shape. The height of the ear cushion, defined as its extension in a height direction that is vertical when the user is wearing the earphone in its intended position and with an upright head, may be in the range of 5 to 10 cm. The width of the ear cushion, defined as its extension in a width direction that is horizontal and parallel to the contact surface when the user is wearing the earphone in its intended position and with an upright head, may be in the range of 5 to 10 cm. The height of the ear cushion may be the same as the width of the ear cushion. The depth of the ear cushion, defined as its extension in a depth direction that is perpendicular to the height direction and the width direction, may be in the range of 0.3 to 3 cm.

The cover of the ear cushion protects the foam core from being worn down or damaged when in use. In addition, the cover of the ear cushion allows for cleaning the ear cushion surfaces without damaging or soaking the foam core. The cover may comprise a leatherette material or other pliable material that is more durable and/or easier cleanable than the foam core. The cover material is denser than the foam core. The second acoustic impedance of the first portion, extending across the exterior surface, is greater than the first acoustic impedance of the foam core. The second acoustic impedance may be in the order of 10:1, compared to the first acoustic impedance of the foam core. Thereby, the cover may further reduce the level of sound that enters the foam core.

The relatively low acoustic impedance of the leaky cover portion(s) may be achieved in different manners. As an example, one or more of the at least one first subportion of the second portion may each comprise one or a plurality of holes or openings in the cover. As another example, each of one or more of the leaky cover portion(s) may comprise a cover material that is thinner, lighter or more pliable than at other portions of the cover. Alternatively or additionally, each of one or more of the leaky cover portion(s) may comprise other materials with low acoustic impedance, such as a mesh or other very thin and light-weight pliable material, preferably arranged to extend across a hole or opening in the cover. It is preferred that the at least one first subportion of the second portion has the third acoustic impedance being equal to—or lower than—the first acoustic impedance of the foam core. Each of the at least one first subportion of the second portion may have any shape, form or orientation. For instance, each of the at least one first subportion of the second portion may have a rectangular shape, a round shape, an oval shape, or an arced shape that extends across an angular section of the annular contact surface, such as at least 10°, at least 20°, or at least 30°. For instance, one or more of the at least one first subportion of the second portion may be arranged to extend along the front of the ear of the user from the lobule to the pinna of the user's ear when the user is wearing the earphone in its intended position.

The cover may further have a third portion extending across the interior surface and having a fifth acoustic impedance. The fifth acoustic impedance may be equal to the second acoustic impedance, equal to the first acoustic impedance, or have a value in between. The third portion of the cover may extend across only a portion of the interior surface and/or the fifth acoustic impedance of the third portion of the cover may vary across the interior surface.

Acoustic impedance is defined as the ratio of acoustic pressure to acoustic volume flow and has the unit Pa*s/m3, also called Rayls per m^2. The specific acoustic impedance is a ratio of acoustic pressure to specific flow, which is the same as flow per unit area, or acoustic volume velocity and it has the unit of Pa*s/m or simply Rayls. As such, specific acoustic impedance describes the density and dampening parameters of a porous media which determines the resulting pressure when a sound wave with a given volume velocity travels through it, unscaled by the cross-section area of the media itself. The resulting pressure will scale with the cross-section area of the given filter (media) if acoustic impedance parameters are utilized instead of specific acoustic impedance.

In the present context, the value of an acoustic impedance, when comparing with other acoustic impedances, refers to the numeric function |Z(f)| that may be computed from the equation:

$$|Z(f)|=\sqrt{R(f)^2+I(f)^2},$$

wherein R(f) is the real part and I(f) is the imaginary part of the acoustic impedance function, and wherein the frequency f is limited to the frequency range in which passive noise reduction is typically effective in earphones, such as the frequency range from about 1 kHz to about 20 kHz. A statement that the acoustic impedance of object, substance or material A is greater than the acoustic impedance of object, substance or material B thus means that |ZA(f)| is greater than |ZB(f)| within that frequency range, wherein ZA(f) is the acoustic impedance function that characterizes object, substance or material A and ZB(f) is the acoustic impedance function that characterizes object, substance or material B.

Generally, an earphone is configured to be worn at an ear of a user. The earphone may be held in its intended position on the user's head by a wearing means, such as e.g. a headband, a neckband, an ear hook, and/or by fastening means enabling the fastening of the earphone to another object worn by the user, such as e.g. a helmet. The earphone may comprise one or more output transducers for providing sound to the user's ear canal in dependence on one or more audio input signals. The earphone may comprise one or more input transducers, such as microphones, arranged to pick up the user's voice and/or signals from the environment and provide corresponding audio output signals. Such input transducers may be arranged on the outside of the earphone, e.g. on a microphone arm, on the inside of the earphone, and/or internally within a housing of the earphone.

The earphone may comprise one or more interfaces, such as wireless transceivers or wired connectors, for exchanging audio input signals and/or audio output signals with other devices, such as mobile phones, computers, radios, or the like. The earphone may comprise one or more signal processors for processing audio input signals and/or audio output signals to provide various functions, such as noise reduction, hearing protection, echo cancelling, active noise cancelling, hear-through, compensation of hearing loss, augmented hearing, etc. The earphone may comprise one or more feedback- and/or feed-forward microphones for providing noise estimation signals to the one or more signal processors for the purpose of feedback- and/or feed-forward active noise cancelling. The earphone may comprise one or more power sources, such as a rechargeable battery.

The earphone may be a so-called "over-the-ear" earphone that is configured such that the ear cushion surrounds the user's ear. Alternatively, the earphone may be a so-called "on-the-ear" earphone that is configured such that the ear cushion abuts mainly the user's ear.

A listening device, such as a headset, may comprise one or two earphones, such as the earphones described above. A binaural listening device comprising two earphones may comprise a wearing means, such as e.g. a headband or a neckband, and/or a cable for mechanically and/or electronically connecting the earphones. The wearing means or the cable may comprise one or more additional input transducers for providing additional audio output signals.

In some embodiments, the at least one first subportion of the second portion of the cover extends across a surface area of at least 20 $mm^2$, at least 50 $mm^2$, or at least 100 $mm^2$. Thereby, the at least one first subportion of the second portion of the cover may branch off sufficient noise from the environment into the foam core to provide an improved passive noise reduction without compromising the passive noise reduction of other portions of the cover.

In some embodiments, the second portion of the cover has at least one second subportion having a fourth acoustic impedance that is greater than the third acoustic impedance of the at least one first subportion of the second portion of the cover. Thereby, the leaky cover portion(s) do(es) not extend across the entire contact surface. This may enable the leaky cover portion(s) to branch off sufficient noise from the environment into the foam core when a leak or gap appears without compromising the passive noise reduction of other portions of the cover, and with only minimal negative effect on wear resistance and/or cleanability of the ear cushion. The at least one first subportion of the second portion of the cover may be arranged at a portion of the contact surface that is likely to not abut the head of the user when the user is wearing the earphone in its intended position while wearing glasses with temple bars and that is likely to abut the head of the user when the user is wearing the earphone in its intended position while not wearing glasses. As an example, the at least one first subportion of the second portion of the cover may be arranged at a portion of the contact surface that has a distance or gap to the head of the user when the user is wearing the earphone in its intended position while wearing glasses with temple bars. Thereby, the leaky cover portion(s) may branch off sufficient noise from the environment into the foam core when a leak or gap appears at this portion of the contact surface to provide an improved passive noise reduction without compromising the passive noise reduction of other portions of the cover. The fourth acoustic impedance may be at least five or ten times greater than the third acoustic impedance, or even at least twenty or fifty times greater than the third acoustic impedance. The fourth acoustic impedance may be the same as the second acoustic impedance.

In some embodiments, the cover may comprise a flexible and/or pliable material. The cover may comprise a bendable material. The cover may comprise plastic or artificial leather such as leatherette material. The cover may be made of a pliable material that is more durable and easier cleanable than the foam core.

In some embodiments, the foam core has a plurality of holes adjacent the at least one first subportion of the second portion of the cover. Thereby, the leaky cover portion(s) may branch off noise from the environment into the plurality of holes when a leak or gap appears to provide an improved passive noise reduction.

In some embodiments, the at least one first subportion of the second portion of the cover comprises a plurality of openings. Thereby, the plurality of openings may abut portions of a surface of the foam core. Hence, the sound from the environment may enter such plurality of the openings and may pass through the foam core having the first acoustic impedance. In addition, the plurality of the openings of the at least one first subportion of the second portion of the cover may further facilitate providing an improved passive noise reduction by e.g. providing a larger surface area than e.g. one opening without compromising the strength or durability of the cover material. The plurality of the openings of the at least one first subportion of the second portion of the cover may be arranged at the same portion of the ear cushion e.g. a top portion, a bottom portion, a front portion or a rear portion of the ear cushion, wherein the top and bottom portions are opposite to each other in the height direction, and wherein the front and rear portions are opposite to each other in the width direction with the front portion being closer than the rear portion to the user's face when the user is wearing the earphone in its intended position.

The plurality of the openings of the at least one first subportion of the second portion of the cover may be arranged at different portions of the ear cushion. For instance, in the case that the plurality of openings comprises two opening, one opening may be arranged at the top portion of the ear cushion and another opening may be arrange at the bottom portion of the ear cushion.

In some embodiments, the at least one first subportion of the second portion of the cover comprises a mesh, the mesh being arranged at at least one opening in the at least one first subportion of the second portion of the cover. The mesh may abut a portion of a surface of the foam core. Thereby, the sound from the environment may enter the mesh and may pass through the foam core having the first acoustic impedance. In addition, the mesh may at least partially protect the foam core against wear, dirt, humidity, etc. The mesh may be arranged over the at least one opening. The mesh may be arranged above the at least one opening. The mesh may be arranged on the at least one opening. The mesh may be any commercially-available conventional mesh material, preferably a flexible, pliable material with low acoustic impedance.

In some embodiments, the foam core comprises at least one tube or bore. The at least one tube or bore may comprises a first end and a second end. The second end may be arranged opposite to the first end. The first end of the at least one tube or bore may be arranged at the at least one first subportion of the second portion of the cover. The second end of the at least one tube or bore may be arranged in the foam core. In some embodiments, the at least one tube or bore may be configured to align with—or extend into—a respective cavity, tube or bore in the housing of the earphone. The at least one tube or bore preferably comprises an air-filled cavity. Thereby, the leaky cover portion(s) may branch off noise from the environment into the at least one tube or bore when a leak appears to further facilitate passive noise reduction. The at least one tube or bore may provide a lower acoustic impedance to sound entering through the leaky cover portion(s) than the foam core itself and may thus further facilitate dissipation of noise sound energy. The first end of the at least one tube or bore may be arranged to open into the at least one first subportion of the second portion of the cover. The tube or bore may have a length, extending from the first end to the second end. The tube or bore may have a width or diameter, extending perpendicular to the length direction. The length may be in the order to 10 to 100 mm. The width or diameter may be in the order of 1 to 5 mm.

In some embodiments, the at least one tube or bore may comprise a tube comprising a bendable material. Thereby, the tube or bore may provide a comfortable experience to the user and adapt to the surface of the users head.

In some embodiments, the at least one tube or bore extends from the at least one first subportion of the second portion of the cover into the foam core perpendicular to the contact surface. At least a portion of the at least one tube or bore may be arranged in a flexible manner with respect to the contact surface. At least a portion of the at least one tube or bore may extend parallel to the contact surface. At least a portion of the at least one tube or bore may extend circumferentially along the annular ear cushion. At least a portion of the at least one tube or bore may extend in any orientation with respect to the contact surface.

In some embodiments, the at least one tube or bore comprises a chamber at the second end. The chamber may be arranged in the foam core. Thereby, the at least one tube or bore comprising the chamber at the second end may provide the Helmholtz resonance effect and may hence facilitate dampening of the sound from the environment i.e. may provide an improved passive noise reduction. In some embodiments, the at least one tube or bore may be configured to align with—or extend into—a respective cavity or chamber in the housing of the earphone.

According to a second aspect of the invention, disclosed is an earphone. The earphone comprises an ear cushion according to the first aspect of the invention. This aspect may generally present the same or similar advantages as the first aspect of the invention.

According to a third aspect of the invention, disclosed is a binaural listening device, such as a binaural headset or a pair of headphones. The binaural listening device comprises two earphones according to the second aspect of the invention. This aspect may generally present the same or similar advantages as the first and the second aspect of the invention.

The present invention relates to different aspects including the ear cushion, the earphone and the binaural listening device described above and in the following, and corresponding parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
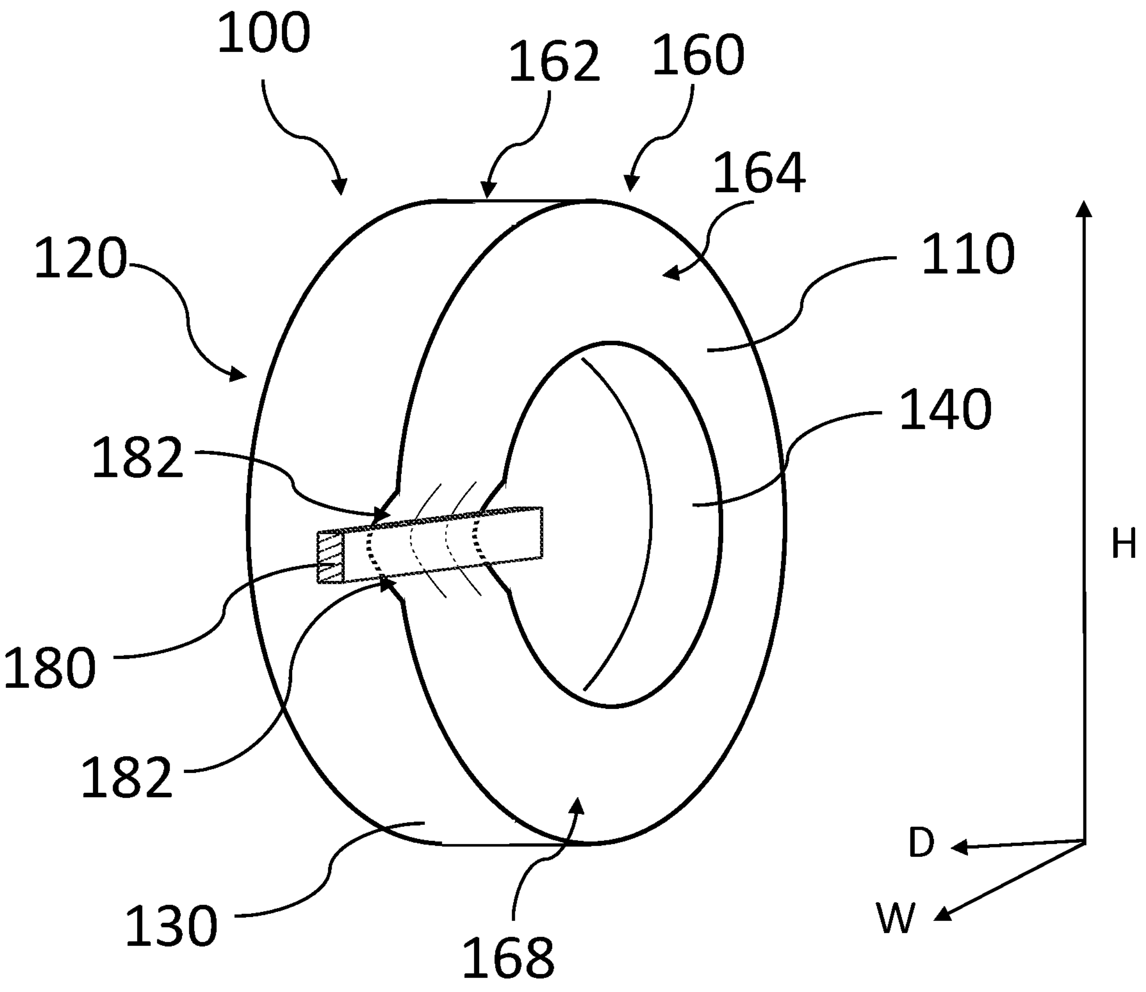
FIG. 1 shows an exemplary ear cushion and illustrates a general problem with ear cushions.

Various embodiments are described hereinafter with reference to the figures. Like reference numerals refer to like elements throughout. Like elements will, thus, not be described in detail with respect to the description of each figure. It should also be noted that the figures are schematic and only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 2:
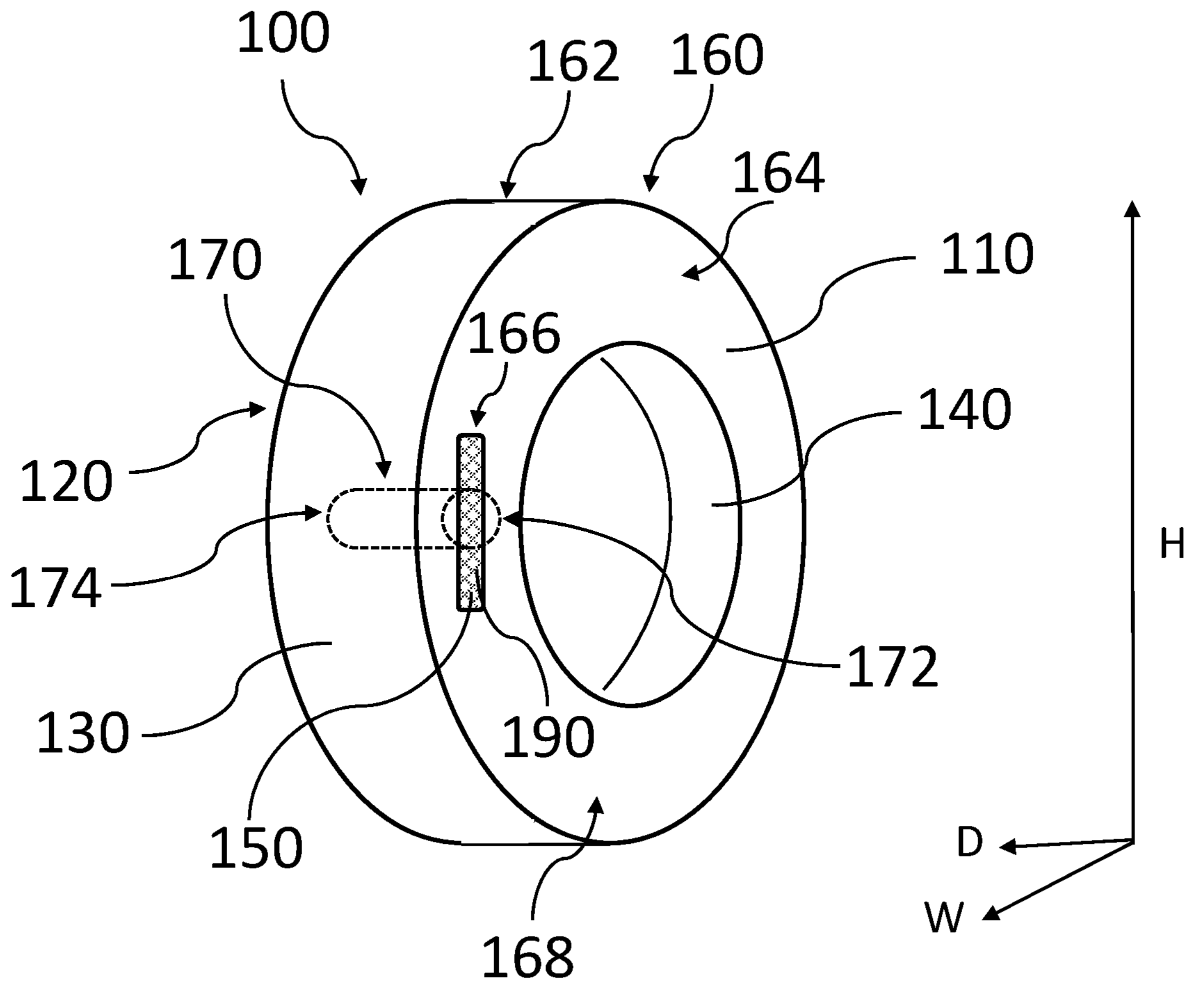
FIG. 2 shows further details of the ear cushion of FIG. 1.
Figure 3:
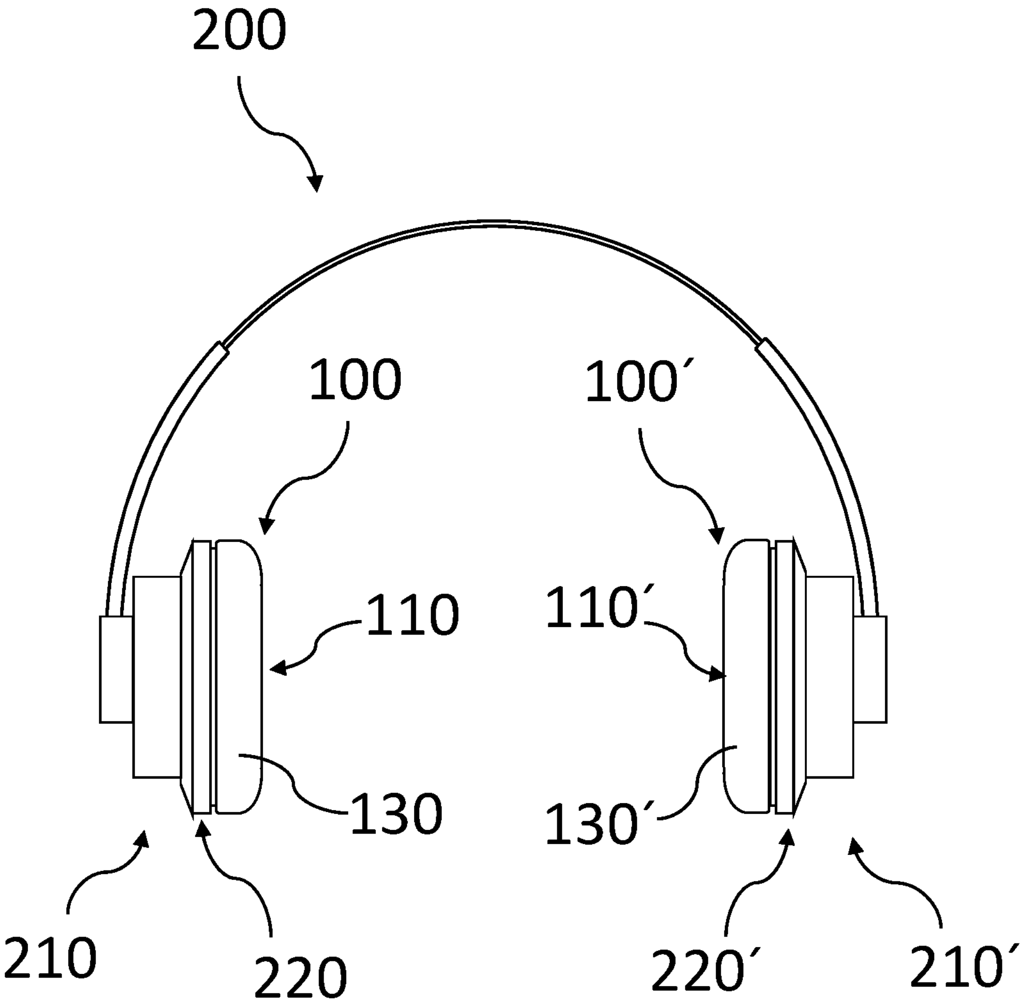
FIG. 3 shows a binaural listening device with two ear cushions according to FIGS. 1 and 2.

FIG. 1 shows a perspective view of an exemplary annular ear cushion 100 for an earphone such as any of the earphones 210 and 210' shown in FIG. 3. The annular ear cushion 100 is configured to be worn at an ear of a user (not shown). The ear cushion 100 is configured to abut the head of the user along an annular contact surface 110 of the ear cushion 100 and to abut or face a housing (220, 220', see FIG. 3) of the earphone 210, 210' along an annular attachment surface 120 of the ear cushion 100 when the user is wearing the earphone 210, 210' in its intended position, thereby reducing the level of sound entering the ear canal of the user from the environment. The ear cushion 100 further comprises an annular exterior surface 130 and an annular interior surface 140 each extending from the contact surface 110 to the attachment surface 120 and facing respectively the environment and the ear canal of the user when the user is wearing the earphone 210, 210' in its intended position. The ear cushion 100 further comprises a foam core 150 (see FIG. 2) having a first acoustic impedance and a cover 160 having a first portion 162 extending across the exterior surface 130 and a second portion 164 extending across the contact surface 110. The first portion 162 of the cover 160 has a second acoustic impedance that is greater than the first acoustic impedance. The cover 160 may further comprise a third portion 166 extending across the interior surface 140 and having a fifth acoustic impedance.

The figure illustrates a typical shape of the ear cushion 110 when the earphone 210, 210' is arranged in its intended position at the ear of the user and is being forced against the head of the user, e.g. by a headband (see FIG. 3). In the figure, the user is wearing a pair of glasses (not shown) with a temple bar of which a section 180 is shown. The contact surface 110 abuts the user's head except for at the depression 170 that is caused by the temple bar section 180 being trapped between the ear cushion 110 and the user's head. Due to the mechanical properties of the ear cushion 110, an air-filled gap 182 is formed on each side of the temple bar section 180. The gaps 182 enable noise sound from the environment to circumvent the ear cushion 110 and thus enter the user's ear canal, thereby reducing the passive noise reduction provided by the earphone 210, 210' with the ear cushion 110.

The figure further shows respectively the height direction H that is vertical when the user is wearing the earphone in its intended position and with an upright head, the width direction W that is horizontal and parallel to the contact surface when the user is wearing the earphone in its intended position, and the depth direction D that is perpendicular to the height direction H and the width direction W.

FIG. 2 shows further details of the ear cushion 100. At least one first subportion 166 of the second portion 164 of the cover 160 has a third acoustic impedance that is smaller than the second acoustic impedance. The at least one first subportion 166 of the second portion 164 of the cover 160 may extend across a surface area of at least 20 $mm^2$.

FIG. 2 further shows that the at least one first subportion 166 of the second portion 164 of the cover 160 comprises a mesh 190. The mesh 190 may be arranged at at least one opening in the cover 160. FIG. 2 further shows that the foam core 150 comprises at least one tube or bore 170. FIG. 2 shows that the at least one tube or bore 170 comprises a first end 172 and a second end 174. The second end 174 of the at least one tube or bore may be arranged opposite to the first end 172. FIG. 2 further shows that the first end 172 of the at least one tube or bore 170 is arranged at the at least one first subportion 166 of the second portion 164 of the cover 160. FIG. 2 further shows that the second end 174 of the at least one tube or bore 170 is arranged in the foam core 150. FIG. 2 further shows that the at least one tube or bore 170 extends from the at least one first subportion 166 of the second portion 164 of the cover 160 into the foam core 150 in a perpendicular manner to the contact surface 110. The at least one tube or bore 170 may comprises a bendable material. The at least one tube or bore 170 may comprise a chamber at the second end 174. The chamber may be arranged in the foam core 150. In some embodiments, the at least one tube or bore 170 may be configured to align with—or extend into—a respective cavity or chamber in the housing of the earphone.

FIG. 3 schematically illustrates a front view of a binaural listening device 200 comprising two earphones 210, 210'. Each earphone 210, 210' of the two earphones 210, 210' comprises an ear cushion 100, 100', each configured in accordance with the ear cushion 100 of FIGS. 1 and 2.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. An annular ear cushion (100, 100") for an earphone (210, 210") configured to be worn at an ear of a user, the ear cushion (100, 100") being configured to abut the head of the user along an annular contact surface (110, 110") of the ear cushion (100, 100") and to abut or face a housing (220, 220") of the earphone (210, 210") along an annular attachment surface (120) of the ear cushion (100, 100") when the user is wearing the earphone (210, 210") in its intended position, thereby reducing the level of sound entering the ear canal of the user from the environment, the ear cushion (100, 100") further comprising an annular exterior surface (130, 130") and an annular interior surface (140) each extending from the contact surface (110, 110") to the attachment surface (120) and facing respectively the environment and the ear canal of the user when the user is wearing the earphone (210, 210") in its intended position, the ear cushion (100, 100") further comprising:
   a foam core (150) having a first acoustic impedance, and
   a cover (160) having a first portion (162) extending across the exterior surface (130, 130") and a second portion (164) extending across the contact surface (110, 110"), wherein the first portion (162) of the cover (160) has a second acoustic impedance that is greater than the first acoustic impedance, and
   wherein at least one first subportion (166) of the second portion (164) of the cover (160) has a third acoustic impedance that is smaller than the second acoustic impedance.
2. The ear cushion (100, 100") according to item 1, wherein the at least one first subportion (166) of the second portion (164) of the cover (160) extends across a surface area of at least 20 $mm^2$, at least 50 $mm^2$ or at least 100 $mm^2$.
3. The ear cushion (100, 100") according to item 1 or 2, wherein the second portion (164) of the cover (160) has at least one second subportion (168) having a fourth acoustic impedance that is greater than the third acoustic impedance of the at least one first subportion (166) of the second portion (164) of the cover (160), and wherein the at least one first subportion (166) of the second portion (164) of the cover (160) is arranged at a portion of the contact surface (110, 110") that is likely to not abut the head of the user when the user is wearing the earphone (210, 210') in its intended position while wearing glasses with temple bars and that is likely to abut the head of the user when the user is wearing the earphone (210, 210') in its intended position while not wearing glasses.
4. The ear cushion (100, 100') according to any of the preceding items, wherein the cover (160) comprises a flexible and/or pliable material.
5. The ear cushion (100, 100') according to any of the preceding items, wherein the foam core (150) has a plurality of holes adjacent the at least one first subportion (166) of the second portion (164) of the cover (160).
6. The ear cushion (100, 100') according to any of the preceding items, wherein the at least one first subportion (166) of the second portion (164) of the cover (160) comprises a plurality of openings.

7. The ear cushion (100, 100') according to any of the preceding items, wherein the at least one first subportion (166) of the second portion (164) of the cover (160) comprises a mesh (190), the mesh (190) being arranged at at least one opening in the at least one first subportion (166) of the second portion (164) of the cover (160).

8. The ear cushion (100, 100') according to any of the preceding items, the foam core (150) further comprising at least one tube or bore (170), wherein the at least one tube or bore (170) comprises a first end (172) and a second end (174), the second end (174) being arranged opposite to the first end (172), wherein the first end (172) of the at least one tube or bore (170) is arranged at the at least one first subportion (166) of the second portion (164) of the cover (160) and wherein the second end (174) of the at least one tube or bore (170) is arranged in the foam core (150).

9. The ear cushion (100, 100') according to item 8, wherein the at least one tube or bore (170) comprises a tube comprising a bendable material.

10. The ear cushion (100, 100') according to item 8 or 9, wherein the at least one tube or bore (170) extends from the at least one first subportion (166) of the second portion (164) of the cover (160) into the foam core (150) perpendicular to the contact surface (110, 1101

11. The ear cushion (100, 100') according to any of the items 8-10, wherein the at least one tube or bore (170) comprises a chamber at the second end (174) and wherein the chamber is arranged in the foam core (150).

12. An earphone (210, 210') comprising an ear cushion (100, 100') according to any of the preceding items.

13. A binaural listening device (200) comprising two earphones (210, 210') according to item 12.

LIST OF REFERENCES

100, 100' Ear cushion
110, 110' Contact surface
120 Attachment surface
130, 130' Exterior surface
140 Interior surface
150 Foam core
160 Cover
162 First portion
164 Second portion
166 First subportion
168 Second subportion
170 Tube or bore
172 First end of tube or bore
174 Second end of tube or bore
180 Temple bar section
182 Air-filled gap
190 mesh
200 Binaural listening device
210, 210' Earphone
220, 220' Housing

The invention claimed is:

1. An annular ear cushion for an earphone configured to be worn at an ear of a user, the annular ear cushion being configured to abut the head of the user along an annular contact surface of the annular ear cushion and to abut or face a housing of the earphone along an annular attachment surface of the annular ear cushion when the user is wearing the earphone in its intended position, thereby reducing the level of sound entering an ear canal of the user from an external environment, the annular ear cushion comprising:

an annular exterior surface and an annular interior surface each extending from a contact surface to the annular attachment surface and facing respectively the external environment and the ear canal of the user when the user is wearing the earphone in its intended position;

a foam core having a first acoustic impedance; and a cover having a first portion extending across the annular exterior surface and a second portion extending across the contact surface, wherein the first portion of the cover has a second acoustic impedance that is greater than the first acoustic impedance, wherein at least one first subportion of the second portion of the cover has a third acoustic impedance that is smaller than the second acoustic impedance, wherein the second portion of the cover has at least one second subportion having a fourth acoustic impedance that is greater than the third acoustic impedance of the at least one first subportion of the second portion of the cover, wherein the at least one first subportion of the second portion of the cover is arranged at a portion of the contact surface that is likely to not abut the head of the user when the user is wearing the earphone in its intended position while wearing glasses with temple bars and that is likely to abut the head of the user when the user is wearing the earphone in its intended position while not wearing glasses, wherein the contact surface is arranged opposite to the attachment surface, wherein the at least one first subportion of the second portion of the cover does not extend across an entirety of the annular contact surface, wherein the foam core comprises:

at least one tube or bore, wherein the at least one tube or bore comprises a first end and a second end, the second end being arranged opposite to the first end, wherein the first end of the at least one tube or bore is arranged at the at least one first subportion of the second portion of the cover, wherein the second end of the at least one tube or bore is arranged in the foam core, and wherein the at least one tube or bore comprises a tube comprising a bendable material.

2. The annular ear cushion for an earphone according to claim 1, wherein the at least one first subportion of the second portion of the cover extends across a surface area of at least 20 $mm^2$, at least 50 $mm^2$ or at least 100 $mm^2$.

3. The annular ear cushion for an earphone according to claim 1, wherein the second portion of the cover has at least one second subportion having a fourth acoustic impedance that is greater than the third acoustic impedance of the at least one first subportion of the second portion of the cover, and wherein the at least one first subportion of the second portion of the cover is arranged at a portion of the contact surface that is likely to not abut the head of the user when the user is wearing the earphone in its intended position while wearing glasses with temple bars and that is likely to abut the head of the user when the user is wearing the earphone in its intended position while not wearing glasses.

4. The annular ear cushion for an earphone according to claim 1, wherein the cover comprises a flexible and/or pliable material.

5. The annular ear cushion for an earphone according claim 1, wherein the foam core has a plurality of holes adjacent the at least one first subportion of the second portion of the cover.

6. The annular ear cushion for an earphone according to claim 1, wherein the at least one first subportion of the second portion of the cover comprises a plurality of openings.

7. The annular ear cushion for an earphone according to claim 1, wherein the at least one first subportion of the second portion of the cover comprises a mesh, the mesh being arranged at least one opening in the at least one first subportion of the second portion of the cover.

8. The annular ear cushion for an earphone according to claim 1, wherein the at least one tube or bore extends from the at least one first subportion of the second portion of the cover into the foam core perpendicular to the contact surface.

9. The annular ear cushion for an earphone according to claim 1, wherein the at least one tube or bore comprises a chamber at the second end and wherein the chamber is arranged in the foam core.

10. An earphone comprising the annular ear cushion for an earphone according to claim 1.

11. A binaural listening device comprising two earphones according to claim 10.

12. The annular ear cushion for an earphone of claim 1 wherein the at least one first subportion is not extending into the interior surface.

* * * * *